(12) United States Patent
Saeki et al.

(10) Patent No.: US 6,909,619 B2
(45) Date of Patent: Jun. 21, 2005

(54) SPIKE CONTROL APPARATUS FOR DC-DC CONVERTER

(75) Inventors: Mitsuo Saeki, Kawasaki (JP); Shigeaki Nakazawa, Kawasaki (JP); Kouichi Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/770,238

(22) Filed: Jan. 29, 2001

(65) Prior Publication Data

US 2002/0001206 A1 Jan. 3, 2002

(30) Foreign Application Priority Data

Jul. 3, 2000 (JP) .................................... 2000-200917

(51) Int. Cl.⁷ ................................................. H02H 7/10
(52) U.S. Cl. ................... 363/50; 363/56.04; 363/56.07; 363/124
(58) Field of Search .................. 363/50, 55, 56, 363/56.04, 56.07, 124

(56) References Cited

U.S. PATENT DOCUMENTS

| | | | | |
|---|---|---|---|---|
| 3,376,492 A | * | 4/1968 | Morgan et al. | |
| RE27,128 E | * | 6/1971 | Morgan et al. | |
| 4,578,630 A | * | 3/1986 | Grosch | 323/282 |
| 4,641,231 A | | 2/1987 | Walker et al. | 363/58 |
| 4,796,145 A | | 1/1989 | Oshikiri | 361/57 |
| 5,408,150 A | | 4/1995 | Wilcox | 327/108 |
| 5,502,610 A | | 3/1996 | Chaney | 361/18 |
| 5,552,695 A | * | 9/1996 | Schwartz | 323/271 |
| 5,646,837 A | * | 7/1997 | Weggel | 363/124 |
| 5,808,455 A | * | 9/1998 | Schwartz et al. | 323/285 |
| 5,828,260 A | | 10/1998 | Taniguchi et al. | 327/387 |
| 5,929,692 A | * | 7/1999 | Carsten | 323/282 |
| 5,933,341 A | * | 8/1999 | Kuriyama et al. | 363/56 |
| 5,955,872 A | * | 9/1999 | Grimm | 323/271 |
| 6,028,755 A | | 2/2000 | Saeki et al. | 361/91.1 |
| 6,046,896 A | | 4/2000 | Saeki et al. | 361/86 |
| 6,069,471 A | * | 5/2000 | Nguyen | 323/271 |
| 6,175,511 B1 | * | 1/2001 | Ooba | 363/124 |

FOREIGN PATENT DOCUMENTS

| | | | |
|---|---|---|---|
| EP | 0 730 340 A1 | 9/1996 | .......... H02M/7/515 |
| JP | HEI 9-83339 | 3/1997 | .......... H03K/19/175 |
| JP | HEI 9-117131 | 5/1997 | .......... H02M/3/155 |

* cited by examiner

*Primary Examiner*—Jeffrey Sterrett
(74) *Attorney, Agent, or Firm*—Staas & Halsey LLP

(57) ABSTRACT

There are disclosed a synchronous rectifying type of DC—DC converter, a DC—DC converter control circuit constituting such a type of DC—DC converter, a monitor circuit for monitoring an operation of a DC—DC converter, and an electronic equipment having a DC—DC converter, considering a conduction current. A DC—DC converter has a main switch and a synchronous rectifying switch, in which said main switch and said synchronous rectifying switch are alternately turned on so that a voltage of a DC electric power is transformed and outputted. A state that said main switch and said synchronous rectifying switch are simultaneously turned on is detected.

35 Claims, 7 Drawing Sheets

SPIKE CONTROL APPARATUS FOR DC-DC CONVERTER

BACKGROUND OF THE INVENTION

1. Field of the Invention

The present invention relates to a synchronous rectifying type of DC—DC converter, a DC—DC converter control circuit constituting such a type of DC—DC converter, a monitor circuit for monitoring an operation of a DC—DC converter, an electronic equipment having a DC—DC converter, and a monitoring method of a DC—DC converter for monitoring an operation of the DC—DC converter.

2. Description of the Related Art

Hitherto, a synchronous rectifying type of DC—DC converter is used in a various type of electronic equipment and apparatus. The synchronous rectifying type of DC—DC converter has a function of step-downing a DC voltage obtained through transformation from a commercial power supply by an AC adapter, and a DC voltage obtained from a battery, for example, to a voltage suitable for an operation of an internal circuit. The synchronous rectifying type of DC—DC converter has the advantages of high efficiency and low loss.

FIG. 5 is a block diagram of a synchronous rectifying type of DC—DC converter.

Between an input terminal 100a and an output terminal 100b of a synchronous rectifying type of DC—DC converter 100, a first switch or FET 110 and an inductor 120 are disposed. Between the connecting point of the first switch (FET 110) with the inductor 120 and the ground, a second switch or FET 130 is connected.

FET is a field effect transistor. In a synchronous rectifying type of DC—DC converter, it often happens that as the first switch and the second switch, FET is used. However, any one is acceptable, which is a switch, and it doesn't matter what kind of transistor and switch are concerned with.

It happens that the first switch or FET 110 is referred to as a main switch, a main transistor, a main switch element, a main side switch, a main side FET, a high side switch, or a high side FET.

It happens that the second switch or FET 130 is referred to as a synchronous rectifying switch, a synchronous rectifying transistor, a synchronous rectifying switch element, a synchronous rectifying side switch, a synchronous rectifying side FET, a low side switch, or a low side FET.

Hereinafter, with respect to the "Description of the Related Art", the above-mentioned switch will be explained using the term of FET which is used typically in the synchronous rectifying type of DC—DC converter.

In the synchronous rectifying type of DC—DC converter 100 shown in FIG. 5, a diode 140 for a flywheel, which is operative when a first FET 110 and a second FET 130 are simultaneously turned off, is connected in parallel with the second FET 130. The DC—DC converter 100 is provided with a control circuit 150 for controlling the first FET 110 and the second FET 130 so that they are alternately turned on. Capacitors C1 and C2, which are connected to the input terminal 100a and the output terminal 100b, respectively, are provided for a stabilization of voltages. The input terminal 100a receives an electric power of a predetermined DC voltage VIN. The control circuit 150 controls the first FET 110 and the second FET 130 so that they are alternately turned on. As a result, there is generated an electric power of a DC voltage VOUT lower than the DC voltage VIN inputted from the input terminal 100a. The electric power thus generated is outputted from the output terminal 100b. The control circuit 150 is typically made of LSI.

FIG. 6 is an illustration showing time variations of turn-on and turn-off of the first FET and the second FET.

Part (A) of FIG. 6 shows turn-on and turn-off of the first FET 110. Part (B) of FIG. 6 shows turn-on and turn-off of the second FET 130. The control circuit 150 controls the first FET 110 and the second FET 130 so that they are alternately turned on. As shown in FIG. 6, there is provided a period of time in which the first FET 110 and the second FET 130 are simultaneously turned off. The reason why this is to do so is that it is prevented that the first FET 110 and the second FET 130 are simultaneously turned on. When the first FET 110 and the second FET 130 are simultaneously turned on, as seen from FIG. 5, the input terminal 100a is grounded through the first FET 110 turned on and the second FET 130 tuned on, so that a large surge current conducts through the first FET 110 and the second FET 130. This brings about a possibility of an occurrence of an erroneous operation on an electronic apparatus being operated by an output of the DC—DC converter owing to lowering of an input voltage of the electronic apparatus. Further, when the surge current exceeds an allowable current of the FET, it involves danger such as smoking and ignition. This brings about a deterioration of reliability of the apparatus.

The diode 140 shown in FIG. 5 operates instead of the second FET 130 in timing that the first FET 110 and the second FET 130 are simultaneously turned on, and has a function of transmitting an electric power to the output terminal 100b side. The diode 140 is larger in a potential drop as compared with the FET, and thus the conversion efficiency is decreased. Accordingly, it is preferable that the period of time that the first FET 110 and the second FET 130 are simultaneously turned on is short as much as possible as far as the surge current is prevented.

As mentioned above, the synchronous rectifying type of DC—DC converter as shown in FIG. 5 has the advantages of high efficiency and low loss. On the other hand, such a DC—DC converter is associated with a problem that a performance of the converter is affected by a performance of the FET. For example, in the event that a circuit, which is large in load, is driven by an output of the DC—DC converter, an FET, which is large in a gate capacity, is used. However, if a driving ability of the control circuit shown in FIG. 5 for the FET is short, before one of the FETs turns off completely, another FET will turn on. This brings about a possibility of an occurrence of a surge current referred to as a short through.

FIG. 7 is an illustration showing time variations of turn-on and turn-off of the first FET and the second FET in the situation as mentioned above.

As seen from FIG. 7, if a driving ability of the control circuit as compared with a gate capacity of the FET is short, it takes a time for translation from the turn-on state to the turn-off state, and before a gate voltage of one of the FETs is lowered to a threshold at which the one FET is turned off, another FET is turned on, and thus there will be generated a term Δt in which both the FETs offer the turn-on state.

The output voltage of the DC—DC converter as shown in FIG. 5 is determined by a duty ratio (a rate of a time on the turn-on state per a period) of the first FET 100. Thus, when the DC—DC converter receives a voltage which exceeds a rated current, the control circuit 150 serves to extremely lower a duty ratio of the first FET 100 in order to obtain an output of a constant voltage. However, the control circuit 150 is also associated with the minimum turn-on time that the control circuit 150 cannot operate normally when a pulse width goes down to a certain value or less. And thus when the pulse width goes down to the certain value or less, the control circuit 150 will erroneously operate, and as a result, it is considered that the output voltage is unstable and the surge current is generated.

In view of the foregoing, according to the synchronous rectifying type of DC—DC converter, there are determined limits of the input voltage and the output voltage, and the maximum output current, and as shown in FIG. 6, there is provided a time in which both the FETs maintain the turn-off state, to prevent an occurrence of the surge current and the like.

However, for example, in the event that an LSI constituting a control circuit is adopted, there is a possibility that the control circuit is not used in accordance with the specification and a large gate capacity of FET is used so that a large current is derived from the DC—DC converter. Alternatively, even if the DC—DC converter or an electronic apparatus incorporating therein the DC—DC converter is used completely in accordance with the specification in the fabrication step of those apparatuses, in some user of the electronic apparatus incorporating therein the DC—DC converter, there is a possibility that an AC adapter of an electronic apparatus other than an AC adapter for example which will be described latter is connected, and as a result, a voltage exceeding a rated input voltage is applied to the DC—DC converter.

SUMMARY OF THE INVENTION

In view of the foregoing, it is an object of the present invention to provide a DC—DC converter, a DC—DC converter control circuit constituting such a type of DC—DC converter, a monitor circuit for monitoring an operation of a DC—DC converter, an electronic equipment having a DC—DC converter, and a monitoring method of a DC—DC converter for monitoring an operation of the DC—DC converter, which more consider the surge current as compared with the conventional ones.

To achieve the above-mentioned object, the present invention provides a DC—DC converter having a main switch and a synchronous rectifying switch, in which said main switch and said synchronous rectifying switch are alternately turned on so that a voltage of a DC electric power is transformed and outputted, said DC—DC converter comprises:

a detection circuit for detecting a state that said main switch and said synchronous rectifying switch are simultaneously turned on.

In the DC—DC converter according to the present invention as mentioned above, it is preferable that said DC—DC converter further comprises a display unit for displaying that said main switch and said synchronous rectifying switch are simultaneously turned on. Or alternatively, it is preferable that said DC—DC converter further comprises an operation stop circuit for stopping a conversion operation of said DC—DC converter in a case where said main switch and said synchronous rectifying switch are simultaneously turned on.

Further, it is preferable that said detection circuit monitors at least one of said main switch and said synchronous rectifying switch.

In the DC—DC converter according to the present invention as mentioned above, it is acceptable that said detection circuit monitors a direction of a current conducting through said synchronous rectifying switch to detect a state that said main switch and said synchronous rectifying switch are simultaneously turned on, or alternatively it is acceptable that said detection circuit monitors a magnitude of a current conducting through said main switch to detect a state that said main switch and said synchronous rectifying switch are simultaneously turned on, or it is acceptable that said detection circuit monitors a driving signal driving said main switch and said synchronous rectifying switch to detect a state that said main switch and said synchronous rectifying switch are simultaneously turned on.

Further, to achieve the above-mentioned object, the present invention provides a DC—DC converter having a first switch and an inductor which are connected in series, and a second switch disposed between a connecting point of said first switch with said inductor and a ground point, in which said first switch and said second switch are alternately turned on so that a voltage of a DC electric power is transformed and outputted, said DC—DC converter comprises:

a detection circuit for detecting a state that said first switch and said second switch are simultaneously turned on.

Furthermore, to achieve the above-mentioned object, the present invention provides a DC—DC converter control circuit, in which a main switch and a synchronous rectifying switch are alternately turned on so that a voltage of a DC electric power is transformed and outputted, said DC—DC converter control circuit comprises:

a detection circuit for detecting a state that said main switch and said synchronous rectifying switch are simultaneously turned on.

In the DC—DC converter control circuit according to the present invention as mentioned above, it is preferable that said DC—DC converter control circuit further comprises detection result output means for outputting a detection result of said detection circuit. Or alternatively it is preferable that said DC—DC converter control circuit further comprises an operation stop circuit for stopping a conversion operation of said DC—DC converter in a case where said main switch and said synchronous rectifying switch are simultaneously turned on.

Further, in the DC—DC converter control circuit according to the present invention as mentioned above, it is preferable that said detection circuit monitors at least one of said main switch and said synchronous rectifying switch.

In the DC—DC converter control circuit according to the present invention as mentioned above, it is acceptable that said detection circuit monitors a direction of a current conducting through said synchronous rectifying switch to detect a state that said main switch and said synchronous rectifying switch are simultaneously turned on. Or alternatively it is acceptable that said detection circuit monitors a magnitude of a current conducting through said main switch to detect a state that said main switch and said synchronous rectifying switch are simultaneously turned on. Or alternatively it is acceptable that said detection circuit monitors a driving signal driving said main switch and said synchronous rectifying switch to detect a state that said main switch and said synchronous rectifying switch are simultaneously turned on.

To achieve the above-mentioned object, the present invention provides a DC—DC converter control circuit, in which a first switch connected in series to an inductor and a second switch disposed between a connecting point of said first switch with said inductor and a ground point are alternately turned on so that a voltage of a DC electric power is transformed and outputted, said DC—DC converter control circuit comprises:

a detection circuit for detecting a state that said first switch and said second switch are simultaneously turned on.

Further, to achieve the above-mentioned object, the present invention provides a monitor circuit for a DC—DC converter control circuit, in which a main switch and a synchronous rectifying switch are alternately turned on so that a voltage of a DC electric power is transformed and outputted, said monitor circuit comprises:

a detection circuit for detecting a state that said main switch and said synchronous rectifying switch are simultaneously turned on.

In the monitor circuit according to the present invention as mentioned above, it is preferable that said monitor circuit further comprises detection result output means for outputting a detection result of said detection circuit, or alternatively it is preferable that said monitor circuit further comprises an operation stop circuit for stopping a conversion operation of said DC—DC converter in a case where said main switch and said synchronous rectifying switch are simultaneously turned on.

Further, in the monitor circuit according to the present invention as mentioned above, it is preferable that said detection circuit monitors at least one of said main switch and said synchronous rectifying switch.

In the monitor circuit according to the present invention as mentioned above, it is acceptable that said detection circuit monitors a direction of a current conducting through said synchronous rectifying switch to detect a state that said main switch and said synchronous rectifying switch are simultaneously turned on. Or alternatively it is acceptable that said detection circuit monitors a magnitude of a current conducting through said main switch to detect a state that said main switch and said synchronous rectifying switch are simultaneously turned on. Or alternatively it is acceptable that said detection circuit monitors a driving signal driving said main switch and said synchronous rectifying switch to detect a state that said main switch and said synchronous rectifying switch are simultaneously turned on.

To achieve the above-mentioned object, the present invention provides a monitor circuit for a DC—DC converter control circuit, in which a first switch connected in series to an inductor and a second switch disposed between a connecting point of said first switch with said inductor and a ground point are alternately turned on so that a voltage of a DC electric power is transformed and outputted, said monitor circuit comprises:

a detection circuit for detecting a state that said first switch and said second switch are simultaneously turned on.

Further to achieve the above-mentioned object, the present invention provides an electronic equipment comprising:

a DC—DC converter having a main switch and a synchronous rectifying switch, in which said main switch and said synchronous rectifying switch are alternately turned on so that a voltage of a DC electric power is transformed and outputted; and a detection circuit for detecting a state that said main switch and said synchronous rectifying switch are simultaneously turned on, wherein said electronic equipment is operative with an electronic power from said DC—DC converter.

In the electronic equipment according to the present invention as mentioned above, it is preferable that said electronic equipment further comprises a display unit for displaying that said main switch and said synchronous rectifying switch are simultaneously turned on. Or alternatively, it is preferable that said electronic equipment further comprises an operation stop circuit for stopping a conversion operation of said DC—DC converter in a case where said main switch and said synchronous rectifying switch are simultaneously turned on.

Further in the electronic equipment according to the present invention as mentioned above, it is preferable that said detection circuit monitors at least one of said main switch and said synchronous rectifying switch.

In the electronic equipment according to the present invention as mentioned above, it is acceptable that said detection circuit monitors a direction of a current conducting through said synchronous rectifying switch to detect a state that said main switch and said synchronous rectifying switch are simultaneously turned on. Or alternatively it is acceptable that said detection circuit monitors a magnitude of a current conducting through said main switch to detect a state that said main switch and said synchronous rectifying switch are simultaneously turned on. Or alternatively it is acceptable that said detection circuit monitors a driving signal driving said main switch and said synchronous rectifying switch to detect a state that said main switch and said synchronous rectifying switch are simultaneously turned on.

To achieve the above-mentioned object, the present invention provides an electronic equipment comprising:

a DC—DC converter having a first switch and an inductor which are connected in series, and a second switch disposed between a connecting point of said first switch with said inductor and a ground point, in which said first switch and said second switch are alternately turned on so that a voltage of a DC electric power is transformed and outputted; and a detection circuit for detecting a state that said first switch and said second switch are simultaneously turned on, wherein said electronic equipment is operative with an electronic power from said DC—DC converter.

Further to achieve the above-mentioned object, the present invention provides a method of monitoring a DC—DC converter having a main switch and a synchronous rectifying switch, wherein said main switch and said synchronous rectifying switch are alternately turned on so that a voltage of a DC electric power is transformed and outputted, and a state that said main switch and said synchronous rectifying switch are simultaneously turned on is detected.

In the method of monitoring a DC—DC converter according to the present invention as mentioned above, it is preferable that it is displayed in accordance with said detection that said main switch and said synchronous rectifying switch are simultaneously turned on. Or alternatively it is preferable that a conversion operation of said DC—DC converter is stopped in accordance with said detection.

Further, in the method of monitoring a DC—DC converter according to the present invention as mentioned above, it is preferable that said detection monitors at least one of said main switch and said synchronous rectifying switch.

In the method of monitoring a DC—DC converter according to the present invention as mentioned above, it is acceptable that said detection monitors a direction of a current conducting through said synchronous rectifying switch to detect a state that said main switch and said synchronous rectifying switch are simultaneously turned on.

Or alternatively it is acceptable that said detection monitors a magnitude of a current conducting through said main switch to detect a state that said main switch and said synchronous rectifying switch are simultaneously turned on. Or alternatively it is acceptable that said detection monitors a driving signal driving said main switch and said synchronous rectifying switch to detect a state that said main switch and said synchronous rectifying switch are simultaneously turned on.

To achieve the above-mentioned object, the present invention provides a method of monitoring a DC—DC converter having a first switch and an inductor which are connected in series, and a second switch disposed between a connecting point of said first switch with said inductor and a ground point, wherein said first switch and said second switch are alternately turned on so that a voltage of a DC electric power is transformed and outputted, and a state that said first switch and said second switch are simultaneously turned on is detected.

The present invention is to detect a state that two switches simultaneously turn on. Thus, it is easy to determine a way of the use out of the specification and the rating at the stage of the trial manufacture and in operation for example, or when a state that the conduction current is generated is detected, the operation is stopped. This feature makes it possible to more enhance a safety.

As mentioned above, according to the present invention, it is easy to deal with a cause of a malfunction, a prevention of smoking and ignition, giving the alarm to a user, and the like, in the event that the surge current or the conduction current occurs owing to an erroneous design or an erroneous usage such that it is out of the specification and the rating.

DETAILED DESCRIPTION OF PREFERRED EMBODIMENTS

Embodiments of the present invention will be described with reference to the accompanying drawings.

Figure 1:
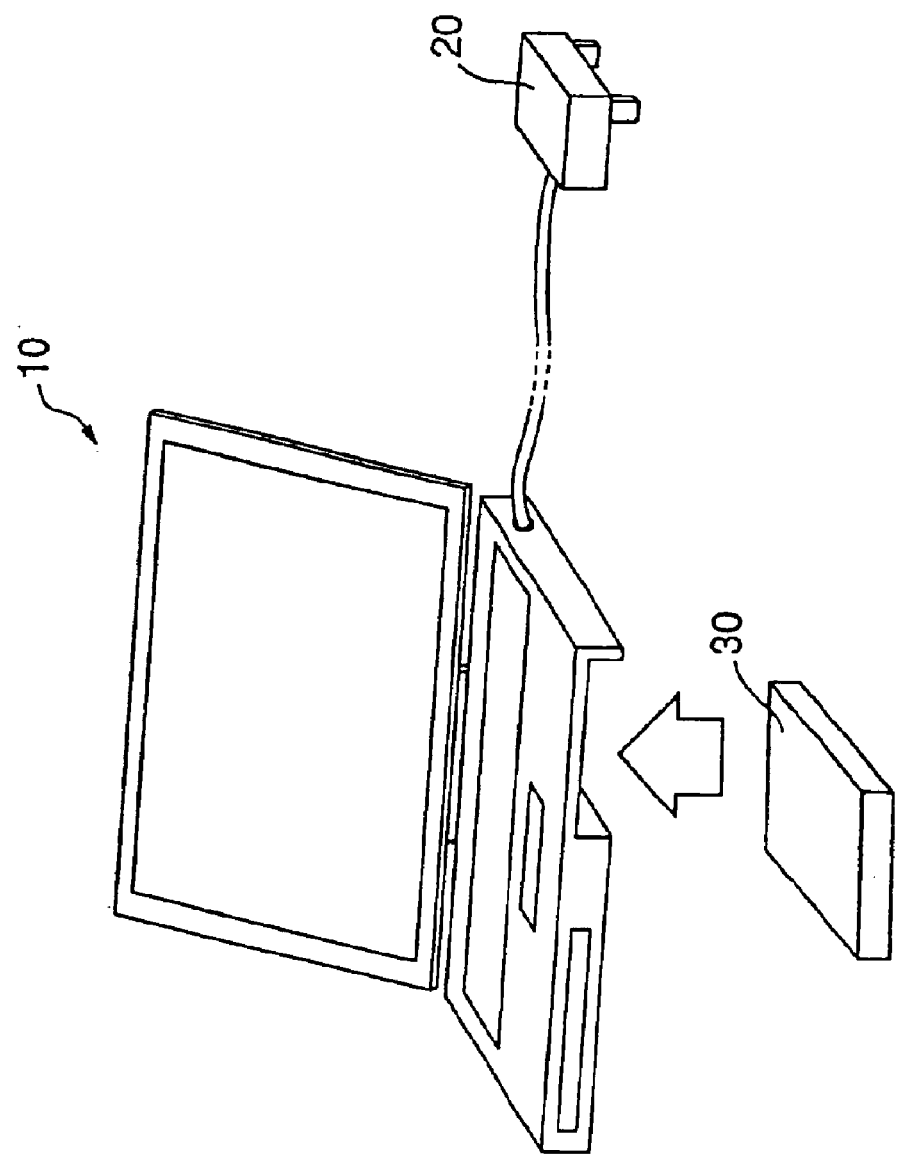
FIG. 1 is a perspective view of a notebook type of personal computer.

FIG. 1 is a perspective view of a notebook type of personal computer.

An AC adapter 20 is connected to a notebook type of personal computer 10 so that the commercial AC power supply is converted into for example 16V or so and is fed to the notebook type of personal computer 10. A battery pack 30 can be loaded onto the notebook type of personal computer 10. The battery pack 30 incorporates thereinto a secondary battery. The secondary battery loaded onto the notebook type of personal computer 10 is charged by an electric power supplied from the commercial power supply via the AC adapter 20. Thus, the notebook type of personal computer 10 is operable for a certain time upon receipt of power supply from the battery pack 30, even if the AC adapter 20 is removed.

Figure 2:
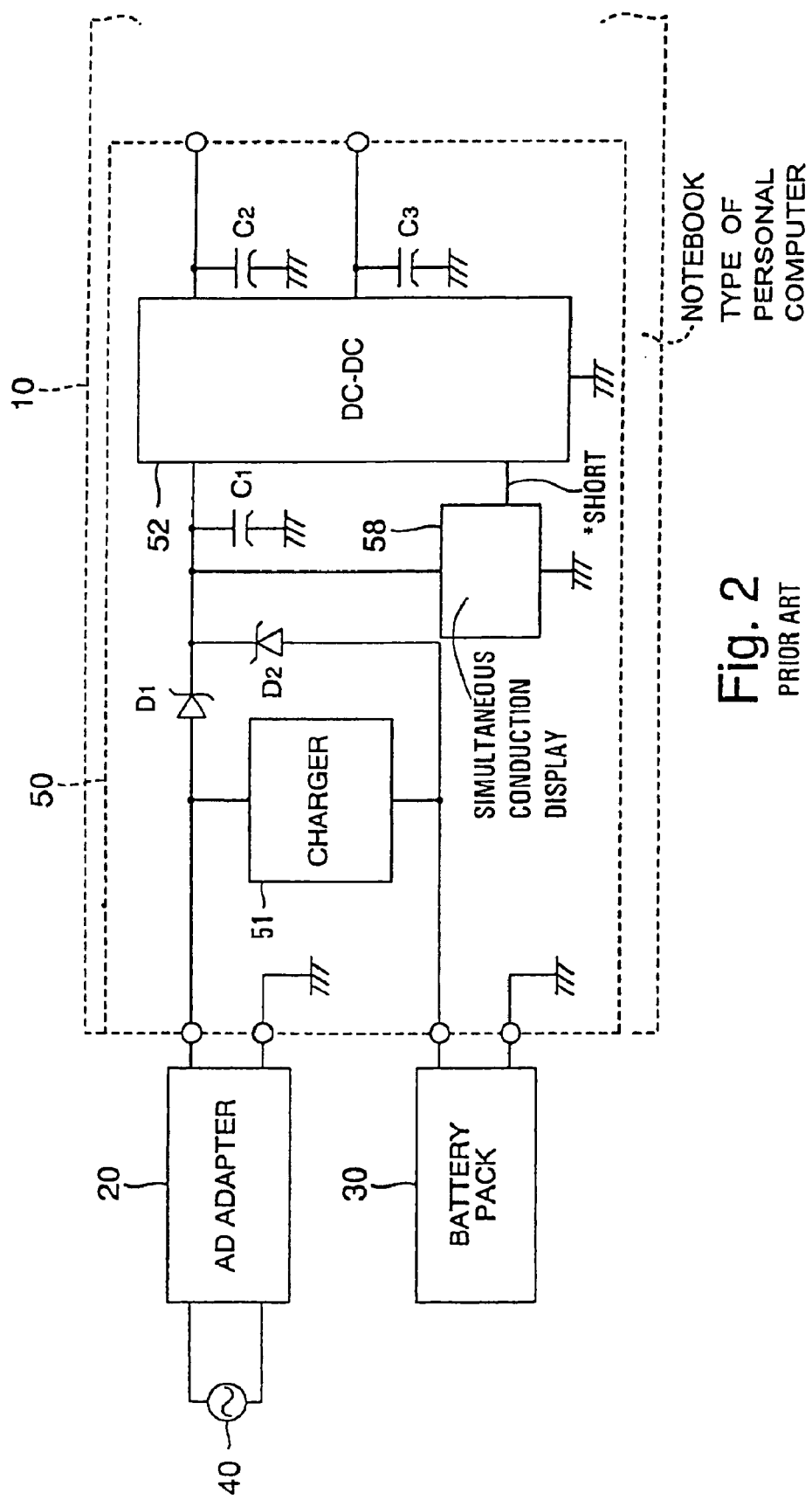
FIG. 2 is a block diagram of a power supply portion of the notebook type of personal computer shown in FIG. 1.

FIG. 2 is a block diagram of a power supply portion of the notebook type of personal computer shown in FIG. 1.

The AC adapter 20 is attached to the notebook type of personal computer 10, and has a function of converting an electric power of a commercial power supply 40 to a DC power of 16 volts for example, and supplying the same to a power supply section 50 of the notebook type of personal computer 10. The electric power supplied from the AC adapter 20 to the power supply section 50 of the notebook type of personal computer 10 is supplied via a diode D1 to a DC—DC converter 52 and also via a charger 51 to the battery pack 30.

The battery pack 30 accommodates a secondary battery (not illustrated). The charger 51 charges the secondary battery in the battery pack 30 with electric power from the AC adapter 20.

The electric power transmitted via the diode D1 to the DC—DC converter 52 is converted by the DC—DC converter 52 into electric powers of voltages to be used in the respective circuits of the notebook type of personal computer 10. According to the embodiment shown in FIG. 2, there are two lines on an output of the DC—DC converter 52. This means that the DC—DC converter 52 generates DC powers of two types of voltage mutually different. Capacitor C1, which is disposed at the input side of the DC—DC converter 52, and Capacitors C2 and C3, which are disposed at the output side of the DC—DC converter 52, are for a voltage stabilization. The electric power generated in the DC—DC converter 52 is supplied to the respective circuits which are operative in the associated voltage of the notebook type of personal computer 10.

When the AC adapter 20 is not connected, an electric power (for example, an electric power of voltage of 12.6V or so) of the secondary battery accommodated in the battery pack 30 is converted via a diode D2 by the DC—DC converter 52 into a predetermined voltage of electric power and then supplied to the respective circuit of the notebook type of personal computer 10.

The power supply section 50 of the notebook type of personal computer 10 shown in FIG. 2 is provided with a display 58 for indicating the fact that a surge current is generated.

Figure 3:
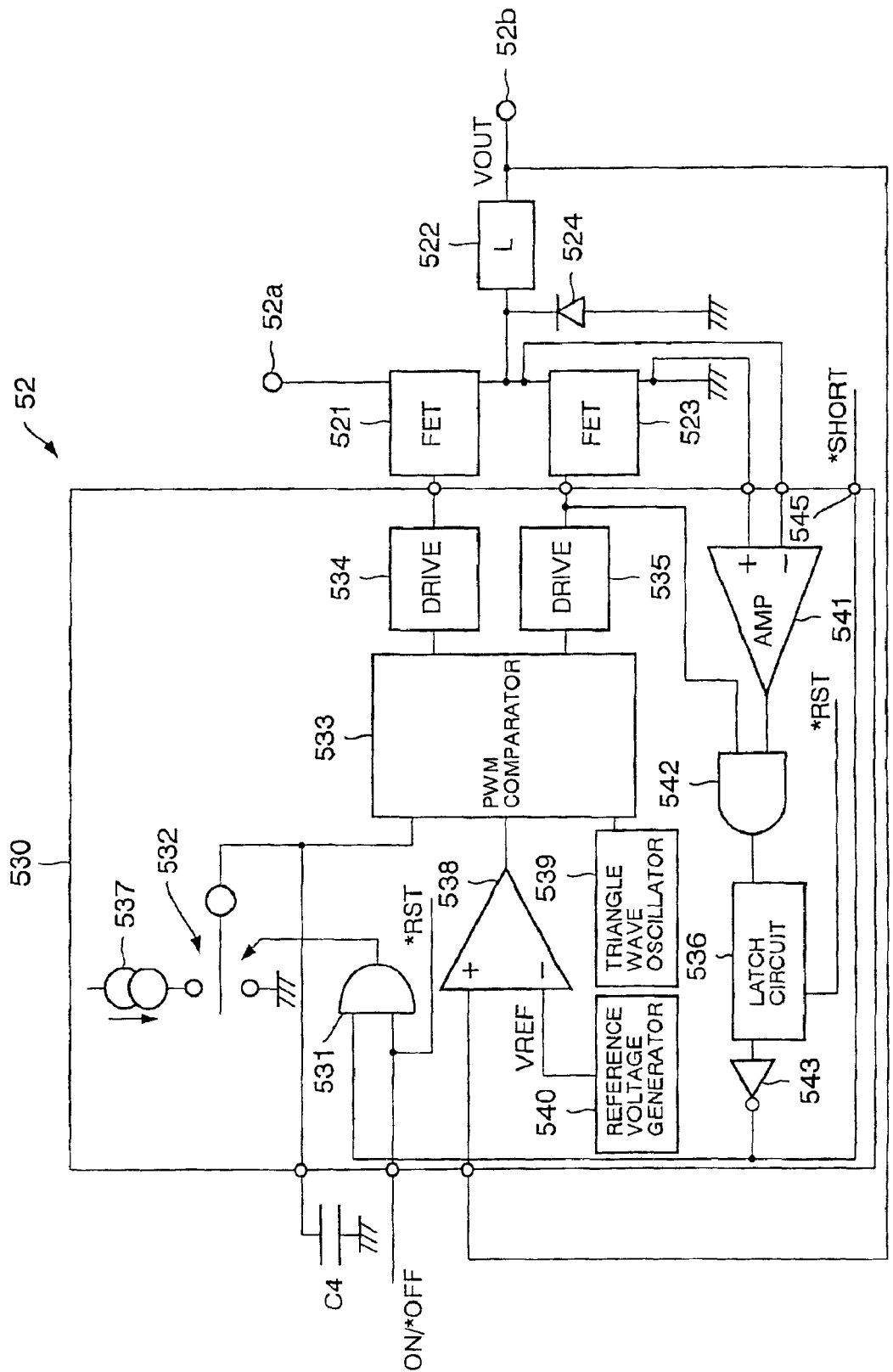
FIG. 3 is a block diagram of the internal structural of the DC—DC converter shown in FIG. 2 with one block.

FIG. 3 is a block diagram of the internal structural of the DC—DC converter shown in FIG. 2 with one block.

Figure 5:
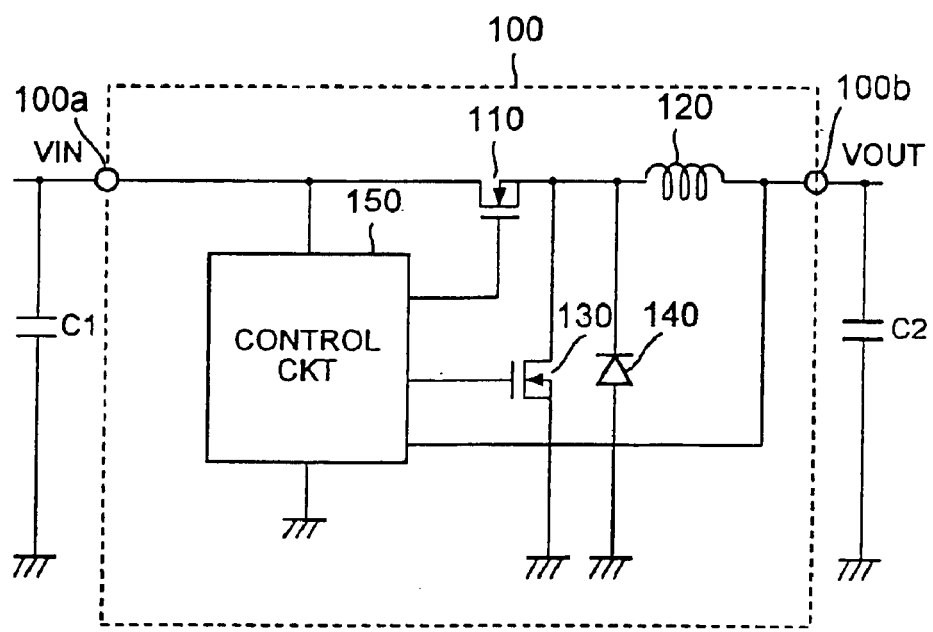
FIG. 5 is a block diagram of a synchronous rectifying type of DC—DC converter.

The DC—DC converter 52 shown in FIG. 3 is the same as the DC—DC converter 100 shown in FIG. 5 in the structure, except the internal structure of a control circuit 530. That is, a first switch or FET 521 and an inductor 522 are connected in series between an input terminal 52a and an output terminal 52b. A second switch or FET 523 is connected between a connecting point of the first switch (FET 521) with the inductor 522 and the ground. A diode 524 is connected in parallel with the second switch (FET 523).

FET is a field-effect transistor. In the synchronous rectifying type of DC—DC converter, it often happens that as the first switch and the second switch, the FET is used. However, any one is acceptable, which is a switch, and it doesn't matter what kind of transistor and switch is concerned with.

It happens that the first switch or FET 521 is referred to as a main switch, a main transistor, a main switch element, a main side switch, a main side FET, a high side switch, or a high side FET.

It happens that the second switch or FET 523 is referred to as a synchronous rectifying switch, a synchronous rectifying transistor, a synchronous rectifying switch element, a synchronous rectifying side switch, a synchronous rectifying side FET, a low side switch, or a low side FET.

Hereinafter, with respect to the description of the present embodiment, the above-mentioned switch will be explained using the term of FET which is used typically in the synchronous rectifying type of DC—DC converter.

The DC—DC converter 52 shown in FIG. 3 is provided with a control circuit 530 for controlling two FETs 521 and 523, as explained referring to FIG. 5, so that two FETs 521 and 523 are alternately turned on. The control circuit 530 is constituted of an LSI (large scale integrated circuit).

The control circuit 530 receives ON/*OFF signals. When the control circuit 530 receives *OFF signal of 'L' level, the operation stops, and when the control circuit 530 receives ON signal of 'H' level, the operation starts. When the control circuit 530 receives *OFF signal of 'L' level, an output of an AND gate 531 offers an 'L' level, and as a result, a switch circuit 532 is connected to the ground side. Thus, a PWM comparator 533, which will be described later, is stopped, and two drive circuits 534 and 535 output signals of 'L' level, so that two FETs 521 and 523 are turned off and whereby the output terminal 52b is maintained to be the ground potential. At that time, a latch circuit 536, which will be described later, receives *RST signal of 'L' level, and thus the latch circuit 536 is reset.

While the switch circuit 532 is typically illustrated in form of a contact switch, it is accepted that the switch circuit 532 is constructed by a transistor and the like.

When the *OFF signal of 'L' level is changed to the ON signal of 'H' level, the AND gate 531 offers an 'H' level, and as a result, the switch circuit 532 is connected to a power supply 537 side. Thus, the PWM comparator 533 starts an operation upon receipt of the supplied electric power. However, between the connecting point of the switch circuit 532 with the PWM comparator 533 and the ground, there is externally provided a capacitor C4 which is charged after the switch circuit 532 is changed over to the power supply 537 side. Accordingly, the electric power supplied to the PWM comparator 533 gradually rises through a charging period of time, that is, a so-called soft start is performed. The reason why this is to do so is to prevent an occurrence of a surge current or the like by a transitional action owing to the sudden supply of the electric power to the PWM comparator 533.

The PWM comparator 533 receives an output of a differential amplifier 538 and an output of a triangle wave oscillator 539.

The differential amplifier 538 receives a reference voltage VREF generated from a reference voltage generator 540 and the output voltage VOUT of the output terminal 52b, and outputs an error signal representative of a deviation of the output voltage VOUT from the reference voltage VREF. The error signal thus outputted is fed to the PWM comparator 533.

Figure 6:
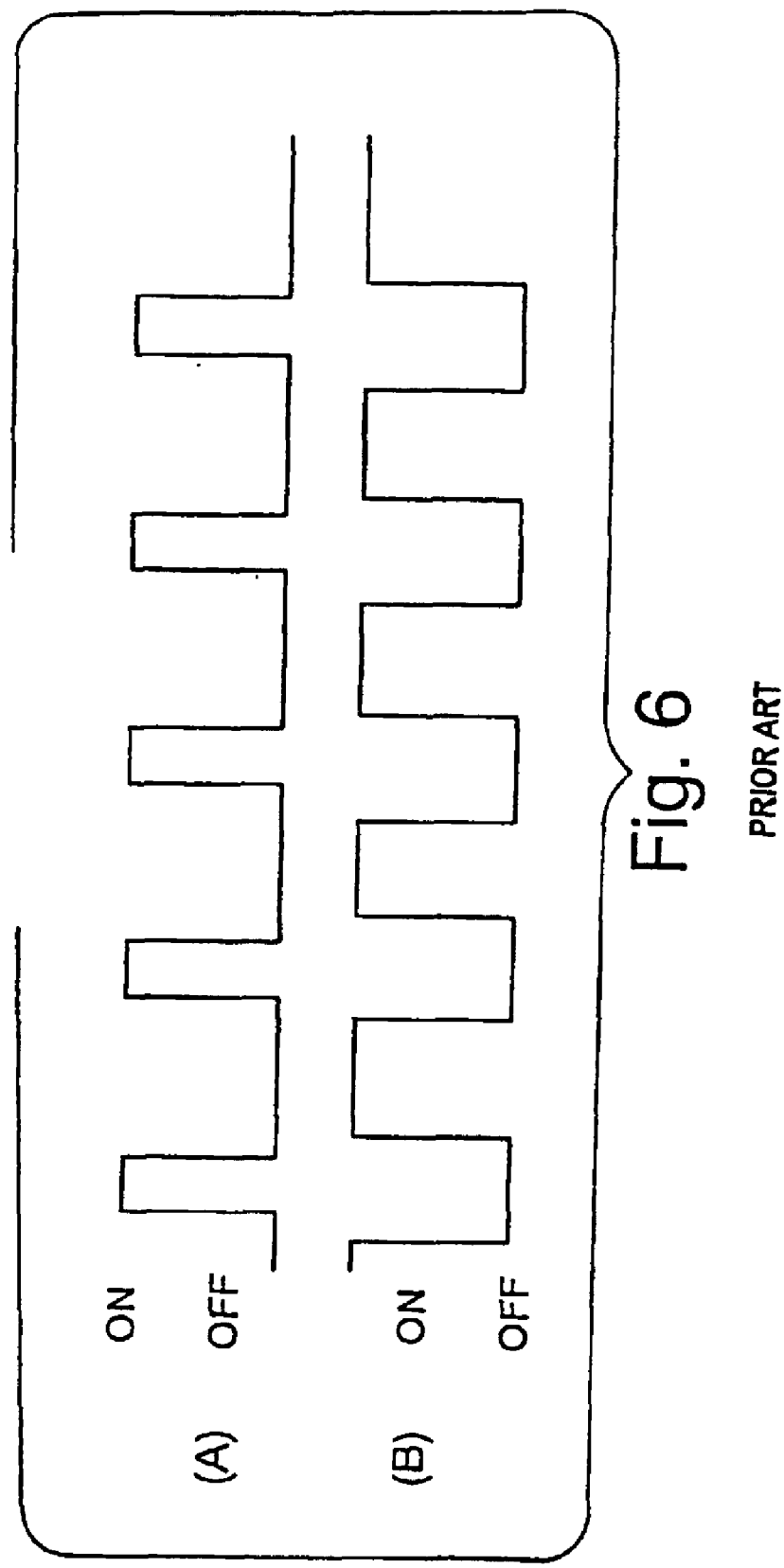
FIG. 6 is an illustration showing time variations of turn-on and turn-off of the first FET and the second FET.

On the other hand, the triangle wave oscillator 539 generates a triangle wave having a predetermined frequency to be fed to the PWM comparator 533. The PWM comparator 533 compares the triangle wave generated from the triangle wave oscillator 539 with the error signal generated from the differential amplifier 538. When the output voltage VOUT is lower than the reference voltage VREF, the PWM comparator 533 generates a pulse signal having the wider pulse width. When the output voltage VOUT is higher than the reference voltage VREF, the PWM comparator 533 generates a pulse signal (cf. part (A) of FIG. 6) having the narrower pulse width. The pulse signal thus generated is fed to a drive circuit 534 for driving the first FET 521. On the other hand, the PWM comparator 533 generates another pulse signal (cf. part (B) of FIG. 6) which does not take simultaneously 'H' level with the pulse signal fed to the drive circuit 534, and is controlled in such a manner that when the pulse width of the pulse signal is widened, the pulse width of the another pulse signal is narrowed, and when the pulse width of the pulse signal is narrowed, the pulse width of the another pulse signal is widened. The another pulse signal thus generated is fed to a drive circuit 535 for driving the second FET 523. In this manner, those two FETs are driven so as to be alternately turned on, and also the pulse width is controlled in such a manner that the output voltage VOUT is a voltage corresponding to the reference voltage VREF.

According to the present embodiment, the control circuit 530 is further provided with an amplifier 541 for detecting a potential difference between both ends of the second FET 523, and an AND gate 542 receiving an output signal from the amplifier 541 and the drive signal outputted from the drive circuit 535 to drive the second FET 523. An output of the AND gate 542 is connected to a latch circuit 536. When the second FET 523 is turned on, in other words, when the first FET 521 is turned off where an input of the AND gate 542, which is connected to the drive circuit 535, offers the 'H' level, a current conducts from the ground via the second FET 523 to the inductor 522. At that time, an 'L' level of signal is fed from the amplifier 541 to the AND gate 542, so that the AND gate 542 outputs the 'L' level of signal. On the other hand, in the event that when the second FET 523 is turned on, the first FET 521 is also turned on simultaneously, a conduction current is conducted via the first FET 521 and the second FET 523, and thus the amplifier 541 outputs the 'H' level of signal. As a result, the AND gate 542 also outputs the 'H' level of signal. The 'H' level of signal thus outputted is latched by the latch circuit 536. That is, the amplifier 541 detects a direction of the current conducting through the second FET (synchronous rectifying side FET) to detect whether the conduction current conducts. That is, it is detected by a detection of the current conducting through the second FET (synchronous rectifying switch) 523 that the conduction current conducts. A case where the conduction current conducts implies that the first FET 521 and the second FET 523 are turned on simultaneously. That is, according to the present embodiment, it is detected by a direction of the current conducting through the second FET (synchronous rectifying switch) 523 that the first FET 521 and the second FET 523 are turned on simultaneously.

An output of the latch circuit 536 is fed via an inverter 543 to the AND gate 531, which receives the ON/*OFF signal, in form of the 'L' level. Thus, the output of the AND gate 531 changes to the 'L' level, and as a result, the switch circuit 532 is changed over to the ground side. Thus, the PWM comparator 533 stops in operation, and both the FETs 521 and 523 turn off through the drive circuits 534 and 535. An output of the inverter 543 connected to the output of the latch circuit 536 is outputted in form of *SHORT signal via a detection result output terminal 545 to the exterior of the control circuit 530. The *SHORT signal informs of the occurrence of the conduction current with the 'L' level. The *SHORT signal outputted from the control circuit 530 is fed to the display 58 shown in FIG. 2 to indicate generation of the conduction current by turning on an LED and the like.

It is acceptable that this display is not for a user of the notebook type of personal computer 10 by way of example of the electric apparatus as shown in FIG. 1, but is for a person of a maker side at the stage of development of apparatuses and equipment, or at the stage of trial manufacture. Further, it is acceptable that the above-mentioned display is performed on a screen (for example, a display of a notebook type of personal computer and a desk-top personal computer) of an electronic apparatus for a user to call the user's attention. It is acceptable that the above-mentioned display is a dedicated display especially provided on a computer, but not the display of the computer. For example, it is possible to use the LED and a small type of screen. Further, according to the information processing apparatus such as the notebook personal computer, a software is operated. In this case, it is possible to inform a user of an error by the software.

When the conduction current is generated, the DC—DC converter is stopped. It is acceptable that this is done for a maker at the stage of trial manufacture, or alternatively for a user, further or for both the maker and the user. The detection result of generation of the conduction current or turn on of both the synchronous rectifying switch and the main switch is utilized typically in the ways as mentioned above, but it is acceptable that such a detection result is utilized for the purpose other than the above.

According to the embodiment shown in FIG. 3, the output of the AND gate 531 is changed to the 'L' level so that the switch circuit 532 is changed over to the ground side. As a result, the PWM comparator 533 is stopped in operation so that both the FETs 521 and 523 turn off through the drive circuits 534 and 535. In this manner, the DC—DC converter is stopped in operation. As the way of the stop of the DC—DC converter in operation, other than the embodiment as mentioned above, it is acceptable that the AND gate 531 is fed directly to the drive circuit 534 so that the first FET 521 is forcibly turned off. That is, the turn-off of the first FET 521 may inhibit the input from the input terminal 52a and stop the operation of the DC—DC converter.

Alternatively, it is acceptable to stop the operation of the DC—DC converter in such a manner that a switch is provided between the first FET 521 and the input terminal Vin 52a of the DC—DC converter, so that the input terminal 52a is disconnected from the first FET 521 by the switch in accordance with the output of the AND gate 531 and thereby inhibiting the input to the DC—DC converter. As mentioned above, as to the stop of the operation of the DC—DC converter, there are various type of ways, and the present invention does not care about the way of the stop of the operation of the DC—DC converter.

Further, according to the present embodiment, the adoption of the display unit makes it possible to readily confirm the generation of the conduction current at the stage of development and the stage of trial manufacture. Further, an arrangement of stopping the operation of the DC—DC converter when the conduction current is generated makes it possible to enhance the safety.

According to the present embodiment as mentioned above, generation of the conduction current or simultaneous turn on of both the main switch and the synchronous rectifying switch is detected by monitoring the second FET 523. However, a way of detecting generation of the conduction current or simultaneous turn on of both the main switch and the synchronous rectifying switch is not restricted to the way as mentioned above. It is acceptable that generation of the conduction current is detected by measuring an amount of current conducting through the first FET 521 for example, and thereby detecting the state of simultaneous turn on of both the main switch and the synchronous rectifying switch. In any of the arrangement that the second FET 523 is monitored, and the arrangement that the first FET 521 is monitored, an arrangement of monitoring the current conducting through the first FET 521 or the second FET 523 or the voltage associated with such a current makes it possible to directly detect generation of the conduction current and thereby performing a detection with great accuracy. Further, the structure as set forth below also makes it possible to detect the conduction current, and it is acceptable to detect the state of simultaneous turn on of both the main switch and the synchronous rectifying switch.

Figure 4:
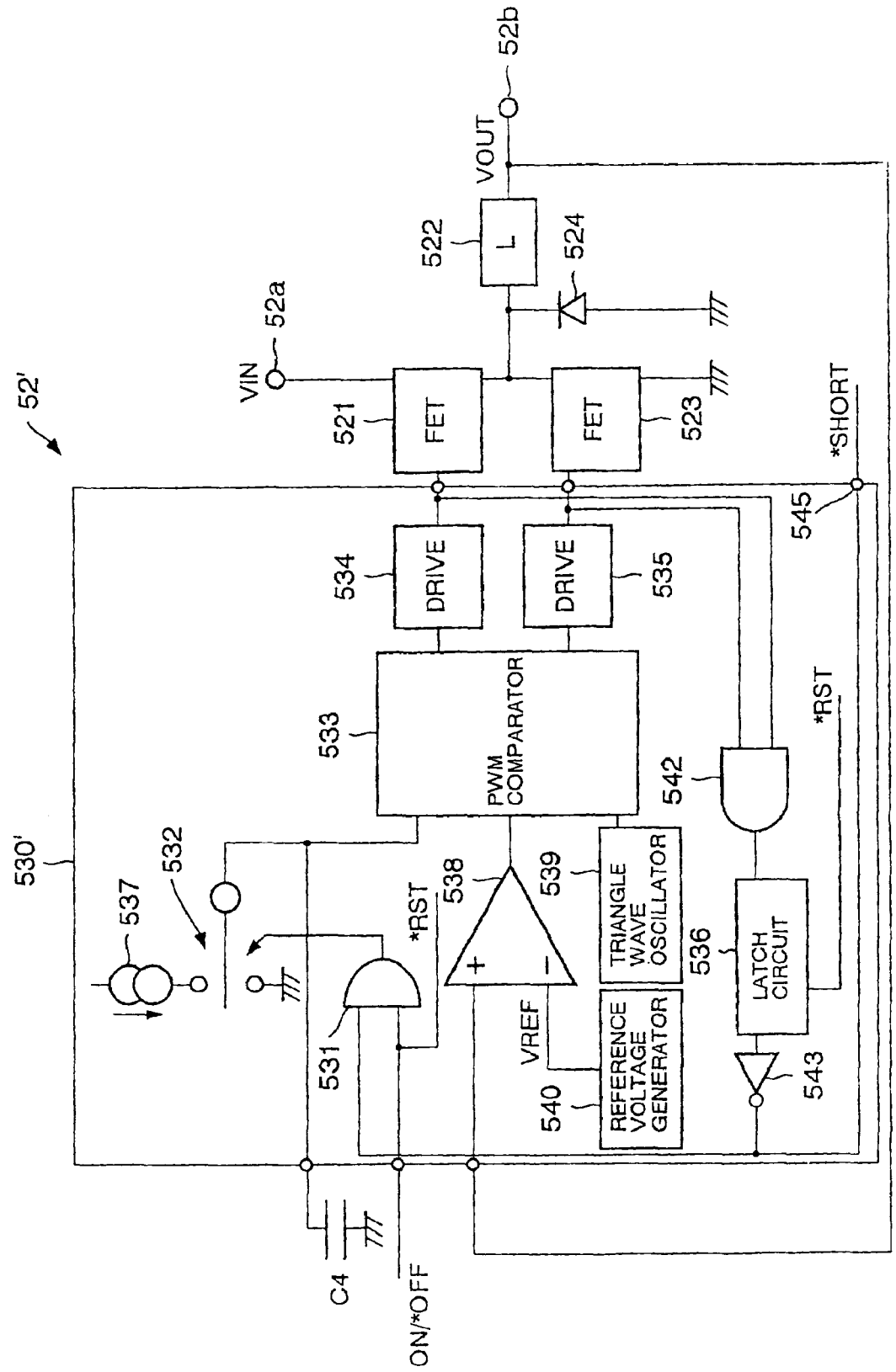
FIG. 4 is a block diagram of the internal structural of a DC—DC converter which can be substituted for the DC—DC converter shown in FIG. 3.

FIG. 4 is a block diagram of the internal structural of a DC—DC converter which can be substituted for the DC—DC converter shown in FIG. 3. In FIG. 4, the same parts are denoted by the same reference numbers as those of FIG. 3, and the redundant description will be omitted.

A control circuit 530' constituting a DC—DC converter 52' shown in FIG. 4 is different from the control circuit 530 shown in FIG. 3 in the point that the amplifier 541 is deleted and the outputs of both the drive circuits 534 and 535 are fed to the AND gate 542.

The outputs of the drive circuits 534 and 535 are connected to gates of the FET 521 and the FET 523, respectively. When the voltage of the gate offers an 'L' level, the associated FET is turned off. When the voltage of the gate offers an 'H' level, the associated FET is turned on. In this manner, a relationship between the gate voltage of the FET and the turn-on or turn-off state of the FET is substantially unequivocally defined.

Figure 7:
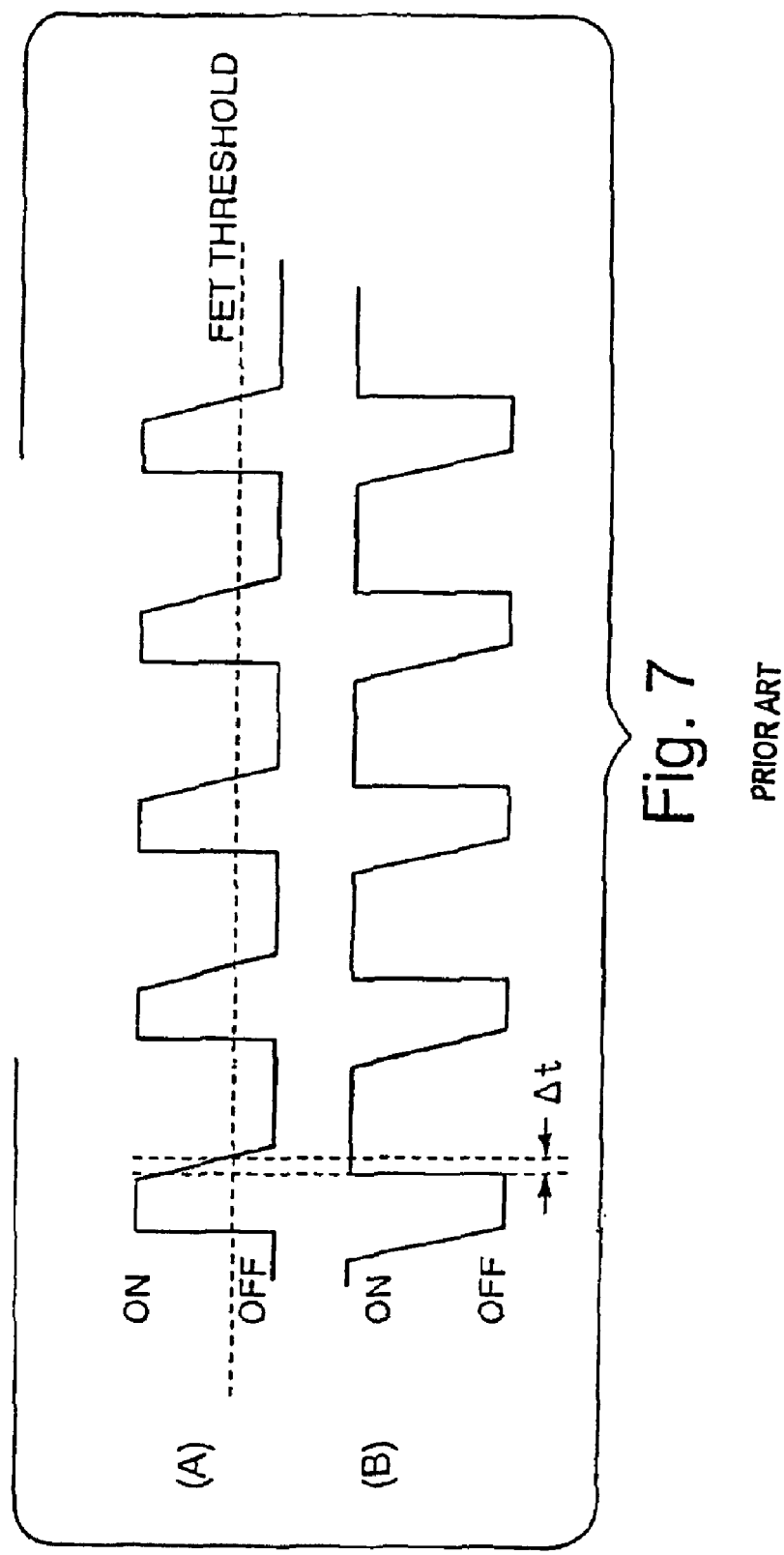
FIG. 7 is an illustration showing time variations of turn-on and turn-off of the first FET and the second FET.

Accordingly, when the DC—DC converter 52' operates normally, at least one of the outputs (driving signals) of the drive circuits 534 and 535 always offer the 'L' level. Thus, the outputs of the AND gate 542 maintains the 'L' level. On the other hand, in the event that when it is associated with the state of generation of the conduction current, that is, an output of one of the drive circuits is still in the state of the 'H' level, while it is changing from the 'H' level to the 'L' level, owing to the relation between the driving capacity of the drive circuit and the gate capacity of the FET to which the drive circuit is connected, an output of another drive circuit is changed to the 'H' level (cf. FIG. 7), both the inputs of the AND gate 542 offer the 'H' level. As a result, the AND gate 542 outputs a signal of the 'H' level, and the signal of the 'H' level is latched by the latch circuit 536.

Thereafter, in accordance with the circuit operation as described above referring to FIG. 3, both the FET 521 and the FET 523 are turned off, so that the DC—DC converter stops in operation. In addition, the *short signal of the 'L' level, which is representative of generation of the conduction current, is outputted and fed to the display 58 so as to indicate generation of the conduction current by turning on an LED and the like.

As shown in FIG. 4, monitoring of the gate voltage of the FET makes it possible to detect whether both the FETs are simultaneously turned on.

As mentioned above, as to a way of detection of the state of a simultaneous turn on of both the synchronous rectifying switch and the main switch, there are various type of ways, and it is acceptable for the present invention to adopt any one of those detection ways.

Incidentally, according to the above-mentioned embodiments of the present invention, there are explained the DC—DC converter loaded onto the notebook type of personal computer by way of example. However, there is no need that the electronic apparatus or equipment of the present invention is the notebook type of personal computer. The present invention is applicable generally to any types of electronic apparatus or equipment, such as a desk-top personal computer, a portable telephone, a video camera, etc., which are provided with the DC—DC converter.

What is claimed is:

1. A switching regulator, comprising:
    a main switch;
    a synchronous switch, where the main switch and the synchronous switch are alternately turned on so that a voltage of a DC electric power is transformed and output; and
    a detection circuit that detects when the main switch and the synchronous switch are simultaneously turned on,
    wherein the detection circuit monitors a driving signal that drives at least one of the main switch and the synchronous switch, and detects a voltage across one of the main switch and the synchronous switch to detect a state in which the main switch and the synchronous switch are simultaneously turned on.

2. A switching regulator according to claim 1, wherein the switching regulator further comprises a display unit that displays when the main switch and the synchronous switch are simultaneously turned on.

3. A switching regulator according to claim 1, wherein the switching regulator further comprises an operation stop circuit that stops a conversion operation of the switching regulator in a case where the main switch and the synchronous switch are simultaneously turned on.

4. A switching regulator according to claim 1, wherein the detection circuit monitors at least one of the main switch and the synchronous switch.

5. A switching regulator according to claim 1, wherein the detection circuit monitors a direction of a current conducting through the synchronous switch to detect a state that the main switch and the synchronous switch are simultaneously turned on.

6. A switching regulator according to claim 1, wherein the detection circuit monitors a magnitude of a current conducting through the main switch to detect a state that the main switch and the synchronous switch are simultaneously turned on.

7. A switching regulator, comprising:
    a first switch;
    an inductor which is connected in series with the first switch;
    a second switch disposed between a connecting point of the first switch with the inductor and a ground point, in which the first switch and the second switch are alternately turned on so that a voltage of a DC electric power is transformed and output; and
    a detection circuit that detects a state that the first switch and the second switch are simultaneously turned on,
    wherein the detection circuit monitors a driving signal that drives at least one of the first switch and the second switch, and detects a voltage across one of the first switch and the second switch to detect the state in which the first switch and the second switch are simultaneously turned on.

8. A switching regulator, comprising:
    a main switch;
    a synchronous switch where the main switch and the synchronous switch are alternately turned on so that a voltage of a DC electric power is transformed and output; and
    a switching control circuit that controls the main switch and the synchronous switch, comprising a detection circuit that detects a state that the main switch and the synchronous switch are simultaneously turned on,
    wherein the detection circuit monitors a driving signal that drives at least one of the main switch and the synchronous switch, and detects a voltage across one of the main switch and the synchronous switch to detect a state in which the main switch and the synchronous switch are simultaneously turned on.

9. A switching regulator according to claim 8, wherein the switching regulator further comprises detection result output that outputs a detection result of the detection circuit.

10. A switching regulator according to claim 8, wherein the switching regulator further comprises an operation stop circuit that stops a conversion operation of the switching regulator in a case where the main switch and the synchronous switch are simultaneously turned on.

11. A switching regulator according to claim 8, wherein the detection circuit monitors at least one of the main switch and the synchronous switch.

12. A switching regulator according to claim 8, wherein the detection circuit monitors a direction of a current conducting through the synchronous switch to detect a state that the main switch and the synchronous switch are simultaneously turned on.

13. A switching regulator according to claim 8, wherein the detection circuit monitors a magnitude of a current conducting through the main switch to detect a state that the main switch and the synchronous switch are simultaneously turned on.

14. A switching regulator control circuit, comprising:
    a first switch connected in series to an inductor;
    a second switch disposed between a connecting point of the first switch with the inductor and a ground point where the first switch and the second switch are alternately turned on so that a voltage of a DC electric power is transformed and output; and
    a detection circuit that detects when the first switch and the second switch are simultaneously turned on,
    wherein the detection circuit monitors a driving signal that drives at least one of the first switch and the second switch, and detects a voltage across one of the first switch and the second switch to detect the state in which the first switch and the second switch are simultaneously turned on.

15. A monitor circuit for a switching regulator, comprising:
    a main switch; and
    a synchronous switch, both of which are alternately turned on so that a voltage of a DC electric power is transformed and output, the monitor circuit comprising a detection circuit that detects a state that the main switch and the synchronous switch are simultaneously turned on,
    wherein the detection circuit monitors a driving signal that drives at least one of the main switch and the synchronous switch, and detects a voltage across one of the main switch and the synchronous switch to detect a state in which the main switch and the synchronous switch are simultaneously turned on.

16. A monitor circuit according to claim 15, wherein the monitor circuit further comprises a detection result output that outputs a detection result of the detection circuit.

17. A monitor circuit according to claim 15, wherein the monitor circuit further comprises an operation stop circuit that stops a conversion operation of the switching regulator in a case where the main switch and the synchronous switch are simultaneously turned on.

18. A monitor circuit according to claim 15, wherein the detection circuit monitors at least one of the main switch and the synchronous switch.

19. A monitor circuit according to claim 15, wherein the detection circuit monitors a direction of a current conducting through the synchronous switch to detect a state that the main switch and the synchronous switch are simultaneously turned on.

20. A monitor circuit according to claim 15, wherein the detection circuit monitors a magnitude of a current conducting through the main switch to detect a state that the main switch and the synchronous switch are simultaneously turned on.

21. A monitor circuit for a switching regulator control circuit, comprising:
 a first switch connected in series to an inductor;
 a second switch disposed between a connecting point of the first switch with the inductor and a ground point where the first switch and the second switch are alternately turned on so that a voltage of a DC electric power is transformed and output; and
 a detection circuit that detects when the first switch and the second switch are simultaneously turned on,
 wherein the detection circuit monitors a driving signal that drives at least one of the first switch and the second switch, and detects a voltage across one of the first switch and the second switch to detect the state in which the first switch and the second switch are simultaneously turned on.

22. An electronic equipment, comprising:
 a switching regulator;
 a main switch;
 a synchronous switch, where the main switch and the synchronous switch are alternately turned on so that a voltage of a DC electric power is transformed and output; and
 a detection circuit that detects when the main switch and the synchronous switch are simultaneously turned on, wherein the electronic equipment is operative with an electronic power from the switching regulator,
 wherein the detection circuit monitors a driving signal that drives at least one of the main switch and the synchronous switch, and detects a voltage across one of the main switch and the synchronous switch to detect a state in which the main switch and the synchronous switch are simultaneously turned on.

23. An electronic equipment according to claim 22, wherein the electronic equipment further comprises a display unit that displays that the main switch and the synchronous switch are simultaneously turned on.

24. An electronic equipment according to claim 22, wherein the electronic equipment further comprises an operation stop circuit that stops a conversion operation of the switching regulator in a case where the main switch and the synchronous switch are simultaneously turned on.

25. An electronic equipment according to claim 22, wherein the detection circuit monitors at least one of the main switch and the synchronous switch.

26. An electronic equipment according to claim 22, wherein the detection circuit monitors a direction of a current conducting through the synchronous switch to detect a state that the main switch and the synchronous switch are simultaneously turned on.

27. An electronic equipment according to claim 22, wherein the detection circuit monitors a magnitude of a current conducting through the main switch to detect a state that the main switch and the synchronous switch are simultaneously turned on.

28. An electronic equipment, comprising:
 a switching regulator, comprising
  a first switch;
  an inductor which is connected in series with the first switch;
  a second switch disposed between a connecting point of the first switch with the inductor and a ground point, in which the first switch and the second switch are alternately turned on so that a voltage of a DC electric power is transformed and output; and
  a detection circuit that detects a state that the first switch and the second switch are simultaneously turned on, wherein the electronic equipment is operative with an electronic power from the DC—DC converter,
 wherein the detection circuit monitors a driving signal that drives at least one of the first switch and the second switch, and detects a voltage across one of the first switch and the second switch to detect the state in which the first switch and the second switch are simultaneously turned on.

29. A method of monitoring a switching regulator, comprising:
 turning on a main switch;
 turning on a synchronous switch, wherein the main switch and the synchronous switch are alternately turned on so that a voltage of a DC electric power is transformed and output; and
 detecting a state that the main switch and the synchronous rectifying switch are simultaneously turned on is detected,
 wherein the detecting monitors a driving signal driving at least one of the main switch and the synchronous switch, and detects a voltage across one of the main switch and the synchronous switch to detect a state in which the main switch and the synchronous switch are simultaneously turned on.

30. A method of monitoring a switching regulator according to claim 29, further comprising displaying in accordance with the detecting, that the main switch and the synchronous switch are simultaneously turned on.

31. A method of monitoring a switching regulator according to claim 29, wherein a conversion operation of the switching regulator is stopped in accordance with the detecting.

32. A method of monitoring a switching regulator according to claim 29, wherein the detecting monitors at least one of the main switch and the synchronous switch.

33. A method of monitoring a switching regulator according to claim 29, wherein the detecting monitors a direction of a current conducting through the synchronous switch to detect a state that the main switch and the synchronous switch are simultaneously turned on.

34. A method of monitoring a switching regulator according to claim 29, wherein the detecting monitors a magnitude of a current conducting through the main switch to detect a state that the main switch and the synchronous switch are simultaneously turned on.

35. A method of monitoring a switching regulator, comprising:
 turning on a first switch and an inductor which are connected in series;

turning on a second switch disposed between a connecting point of the first switch with the inductor and a ground point, wherein the first switch and the second switch are alternately turned on so that a voltage of a DC electric power is transformed and output; and detecting a voltage across one of the first switch and the second switch to detect a state in which the first switch and the second switch are simultaneously turned on.

* * * * *

UNITED STATES PATENT AND TRADEMARK OFFICE
CERTIFICATE OF CORRECTION

PATENT NO.    : 6,909,619 B2
DATED         : June 21, 2005
INVENTOR(S)   : Mitsuo Saeki et al.

It is certified that error appears in the above-identified patent and that said Letters Patent is hereby corrected as shown below:

Title page,
Item [54], Title, should read -- SPIKE CONTROL APPARATUS AND METHOD FOR DC-DC CONVERTER --.

Signed and Sealed this

Thirty-first Day of January, 2006

JON W. DUDAS
*Director of the United States Patent and Trademark Office*